UNITED STATES PATENT OFFICE.

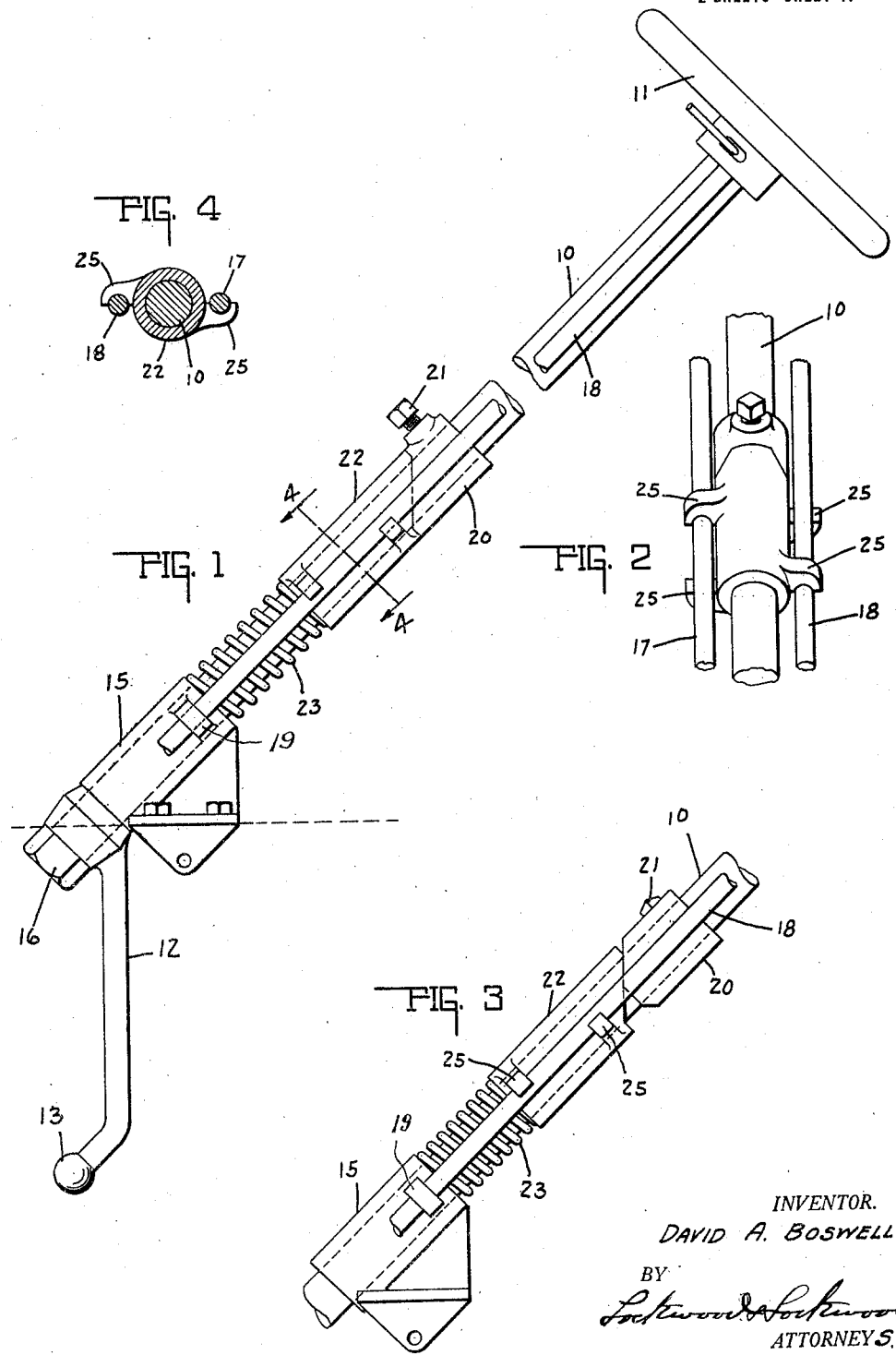

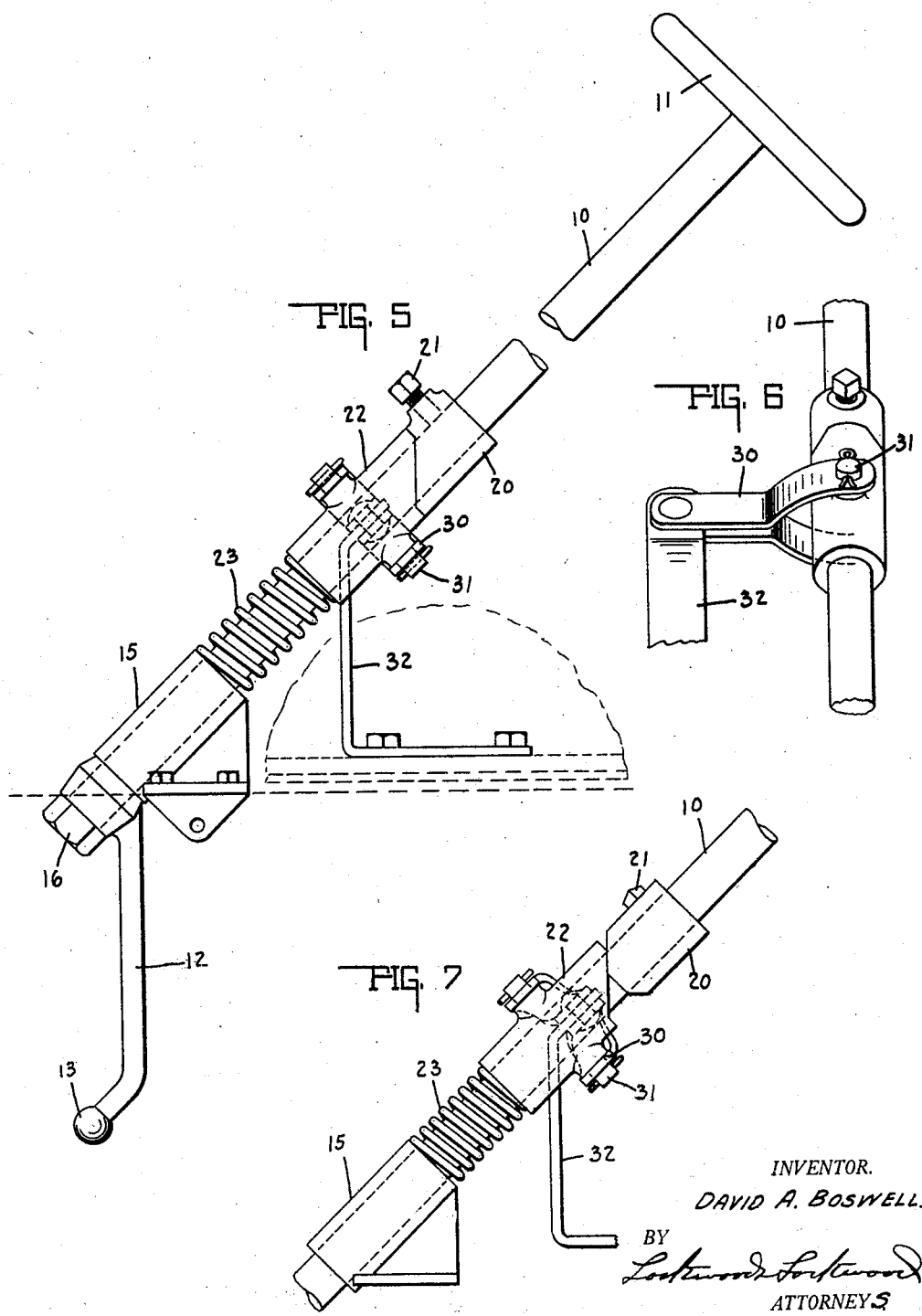

DAVID A. BOSWELL, OF INDIANAPOLIS, INDIANA, ASSIGNOR, BY DIRECT AND MESNE ASSIGNMENTS, OF ONE-HALF TO JACKSON H. KERR AND ONE-HALF TO HARRY P. TALBERT, BOTH OF INDIANAPOLIS, INDIANA.

AUTOMOBILE STEERING CONTROL.

1,389,620.  Specification of Letters Patent.  Patented Sept. 6, 1921.

Application filed March 13, 1920. Serial No. 365,463.

*To all whom it may concern:*

Be it known that I, DAVID A. BOSWELL, a citizen of the United States, and a resident of Indianapolis, county of Marion, and State of Indiana, have invented a certain new and useful Automobile Steering Control; and I do hereby declare that the following is a full, clear, and exact description thereof, reference being had to the accompanying drawings, in which like numerals refer to like parts.

This invention relates to yielding means for automatically holding the steering apparatus of an automobile in normal position, so as to largely relieve the chauffeur of the automobile of that duty, and thus cause the automobile to keep in the middle of the road or pursue a straight forward course without too much attention from the chauffeur. The means constituting this invention are mounted on and operated in connection with the steering shaft of the automobile and consists, broadly speaking, of two coöperating cam faced members, one stationary and the other secured on the steering shaft, and yielding means for turning the steering shaft supported cam in a normal position with relation to the stationary cam member after the steering shaft has been oscillated one way or the other, and thus bring the steering mechanism to what may be considered normal position.

The full nature of this invention will be understood from the accompanying drawings and the following description and claims.

In the drawings Figure 1 is a side elevation of a steering shaft and associated parts centrally broken away embodying one form of the invention, the parts being shown in their normal position. Fig. 2 is a plan view of the central part of what is shown in Fig. 1. Fig. 3 is a side elevation of a central part of what is shown in Fig. 1 of the parts in position during the operation of the steering shaft. Fig. 4 is a cross section on the line 4—4 of Fig. 1. Fig. 5 is a view similar to Fig. 1 illustrating a modified means of mounting the mechanism. Fig. 6 is a perspective view of a central portion thereof. Fig. 7 is a view of the modified construction shown in Fig. 5 with the parts in the position substantially similar to Fig. 3.

There is shown herein the usual steering shaft 10 with a wheel 11 at the upper end and an arm 12 secured to the lower end, carrying on its lower end a ball which is operatively connected with a transverse steering rod associated with the front wheels of a Ford automobile, said latter parts however not being shown, as they are all very common and of well known construction. When the steering shaft is oscillated to the right or to the left, the means just referred to cause the desired steering or turning movement of the front wheels of the automobile.

The steering shaft shown in Fig. 1 is mounted in the bearing 15 secured stationarily to the floor of the automobile body, or other stationary part of the automobile. There is a nut 16 at the lower end of the steering shaft for holding the arm 12 in place, and it is to be understood that the steering shaft is in longitudinal alinement with the nut and bearing. On one side of the steering shaft there is a rod 17 for controlling the gasolene supply, and on the opposite side a rod 18 for controlling the ignition or current through the spark plugs. These rods pass through ears 19 on the bearing 15 and are arranged, by means not shown, so as to have movement for causing them to function.

The new features, which are associated with the foregoing mechanism constituting this invention, consist of a cam member 20 secured upon the shaft 18 by a set screw 21 so as to turn therewith, and with its lower face cam shaped or provided with an inclined surface on each side thereof. Another cam member 22 is slidably mounted on the steering shaft and has its upper end cam faced to correspond, fit and coöperate with the cam face of the member 20, as shown in Fig. 1. A spiral spring 23 surrounds the steering shaft below the member 22 and between and coöperating with said cam member 22 and the bearing 15, so that the spring will forcibly hold the cam member 22 in engagement with the cam face of the cam member 20, and when the parts interfit, as shown in Fig. 1, will resist but not prevent oscillation of the steering shaft.

In the preferred form of the invention the tension of the yielding means can be adjusted as follows. The set screw 21, when unscrewed, permits the cam member 20 to be moved longitudinally upon the shaft 10, and in turn the cam member 22 also moves longitudinally, which permits the spring 23 to extend and thus reduces the tension of the yielding means. In other forms of the invention the spring tension will be adjusted in other suitable ways.

With the foregoing construction when the steering shaft is not forcibly held by the hands of the chauffeur, it will automatically assume the position shown in Fig. 1, whereby the steering mechanism will hold the front wheels of the automobile straight ahead so that the automobile will tend to travel in a straight forward direction. If, however, one wishes to turn the automobile he forcibly oscillates the steering shaft to the right or to the left as desired, one operated position of the parts being shown in Fig. 3. This is done while turning a corner, but when the corner is turned and the road runs straight ahead, by relaxing the hold on the steering wheel the spring 23 and cam members will cause a return of the cam shaft to the normal position. Fig. 2 illustrates the cam construction whereby the steering means is returned to the normal position irrespective of the direction of oscillation of the shaft.

In order to operate in the foregoing manner it is necessary that the cam member 22 shall not rotate, and in the form shown in Fig. 1 it is prevented from rotation by the arms 25 engaging opposite sides of the rods 17 and 18.

The modified form shown in Figs. 5, 6 and 7 shows the invention adapted to the construction, wherein no use is made of the gasolene control or ignition control rods and they are not shown in these figures. To prevent the oscillatory movement of the cam member 22, it is, as shown in Figs. 5 and 6, held in place by the yoke 30 connected therewith by the pin 31, said yoke 30 being at its outer end secured to, and held in place by a plate or bracket 32 which is fastened to the floor of the car, or other stationary means, and extends upward to the part 30. This is simply one means for holding the cam member 22 from rotation, the invention, however, not being limited to the particular details of the means for accomplishing that result, but in any construction that may be adapted. The means for holding the cam member 22 from rotation must be such as to permit its longitudinal movement on the steering shaft.

The invention claimed is:

1. The combination with a steering shaft of an automobile, of two members mounted thereon with their adjacent faces correspondingly formed to interfit with each other so that one may move relative to the other, one of said members being secured rigidly to the shaft and the other non-rotary but longitudinally slidable thereof, and yielding means for forcing said members toward each other so that the steering shaft may be automatically maintained in a normal position.

2. The combination with a steering shaft of an automobile and a bearing member, of a member rigidly secured on said shaft having at one end a cam face, another member slidable on said shaft having at one end a corresponding cam face to engage and interfit with the cam face of said first mentioned cam member, means for holding said last mentioned cam member from rotary movement but permitting its longitudinal movement on said shaft, and yielding means between said bearing and said longitudinally movable cam member for forcing the latter toward the cam member which is secured on the shaft.

3. The combination with the steering shaft of an automobile of two cam members thereon, the adjacent faces of each having a similarly inclined surface on each side of the shaft so that they will interfit, means for holding one of said members from longitudinal movement but permitting rotary movement with respect to the automobile, means for holding the other one of said members from rotary movement but permitting longitudinal movement of the shaft, and a spring tending to force said members toward each other.

4. The combination with the steering shaft of an automobile, and one or more rods parallel with and adjacent thereto, of a cam member secured on the shaft with one end provided with a cam face, another cam member slidably mounted on the shaft with a cam face to interfit with a cam face of the secured member, means on said slidably movable cam member which engage said rod or rods for preventing rotary movement thereof, and a spring tending to force said members toward each other.

5. The combination with the steering shaft of an automobile, of two members mounted thereon with adjacent correspondingly formed cam-shaped faces, one of said cam members being rotatable with said shaft, means for holding the other cam member from rotation, but permitting longitudinal movement between said members and said shaft, spring means for yieldingly forcing said two cam members toward each other, and means for adjusting the spring tension.

In witness whereof, I have hereunto affixed my signature.

DAVID A. BOSWELL.